(12) United States Patent
Beasley et al.

(10) Patent No.: US 11,170,328 B2
(45) Date of Patent: Nov. 9, 2021

(54) SANITATION MANAGEMENT SYSTEM FOR PERISHABLE GOOD TRANSPORT

(71) Applicant: CARRIER CORPORATION, Palm Beach Gardens, FL (US)

(72) Inventors: Marc Beasley, Beverly, MA (US); Ciara Poolman, Syracuse, NY (US); Robert A. Chopko, Baldwinsville, NY (US); John Cronin, Bonita Springs, FL (US); Joseph George Bodkin, South Burlington, VT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 236 days.

(21) Appl. No.: 16/318,552

(22) PCT Filed: Jul. 20, 2017

(86) PCT No.: PCT/US2017/043051
§ 371 (c)(1),
(2) Date: Jan. 17, 2019

(87) PCT Pub. No.: WO2018/017820
PCT Pub. Date: Jan. 25, 2018

(65) Prior Publication Data
US 2019/0258974 A1    Aug. 22, 2019

Related U.S. Application Data

(60) Provisional application No. 62/365,686, filed on Jul. 22, 2016.

(51) Int. Cl.
*G06Q 10/06* (2012.01)
*G06Q 10/10* (2012.01)
(Continued)

(52) U.S. Cl.
CPC ......... *G06Q 10/0635* (2013.01); *G06Q 10/08* (2013.01); *G06Q 10/1097* (2013.01); *G08B 21/182* (2013.01)

(58) Field of Classification Search
CPC .................................................. G06Q 10/0635
See application file for complete search history.

(56) References Cited

U.S. PATENT DOCUMENTS 6,955,100 B1 * 10/2005 Barich ................. G01M 17/08
73/865.8
7,085,684 B2    8/2006 Yoshie et al.
(Continued)

FOREIGN PATENT DOCUMENTS

CN    103712701 A    4/2014
CN    104317339 A    1/2015
(Continued)

OTHER PUBLICATIONS

Nyssa Ackerley et al., Food Transportation Safety: Characterizing Risks and Controls by Use of Expert Opinion, Food Protection Trends, vol. 30, No. 4, pp. 212-222 (Year: 2010).*
(Continued)

*Primary Examiner* — Andre D Boyce
(74) *Attorney, Agent, or Firm* — Cantor Colburn LLP (57) ABSTRACT

A system for managing sanitation of a container for perishable goods including: a storage device to store perishable good requirements, sanitation schedule parameters, sanitation requirements, sanitation test results, and perishable good parameters associated with the perishable goods; and a sanitation management system coupled to the storage device. The sanitation management system including: a sanitation assessment module to determine sanitation risk levels in response to at least one of the perishable good parameters, the perishable good requirements, the sanitation schedule parameters, sanitation test results, and the sanita- (Continued)

tion requirements; a sanitation schedule module to determine sanitation schedule adjustments in response to at least one of the sanitation risk level, the sanitation schedule parameters, and the sanitation requirements; and a meshing module to determine output parameters in response to at least one of the sanitation risk levels and the sanitation schedule adjustments.

20 Claims, 3 Drawing Sheets (51) Int. Cl.
*G08B 21/18* (2006.01)
*G06Q 10/08* (2012.01)

(56) References Cited

U.S. PATENT DOCUMENTS

| | | | |
|---|---|---|---|
| 7,212,955 B2 | 5/2007 | Kirshenbaum et al. | |
| 8,438,268 B2 | 5/2013 | Mills | |
| 2008/0136649 A1* | 6/2008 | Van De Hey | E03C 1/057 340/573.1 |
| 2008/0166460 A1* | 7/2008 | Palmer | G06Q 10/08 426/389 |
| 2008/0289649 A1* | 11/2008 | Woytkiw | B60S 3/00 134/1 |
| 2009/0308412 A1* | 12/2009 | Dixon | B08B 9/093 134/10 |
| 2012/0274470 A1 | 11/2012 | Sandvick | |
| 2013/0158828 A1* | 6/2013 | McAlister | B60L 8/006 701/70 |
| 2013/0271290 A1 | 10/2013 | Saenz et al. | |
| 2014/0014188 A1* | 1/2014 | Szydlowski | F17D 1/08 137/2 |
| 2014/0046722 A1* | 2/2014 | Rosenbloom | G16H 40/20 705/7.28 |
| 2014/0222522 A1 | 8/2014 | Chait | |
| 2014/0313055 A1 | 10/2014 | Warkentin et al. | |
| 2015/0170442 A1 | 6/2015 | Senalp et al. | |
| 2015/0221225 A1* | 8/2015 | Petersen | G08G 5/0043 701/120 |
| 2015/0310385 A1* | 10/2015 | King | G06Q 10/087 705/28 |
| 2017/0178070 A1* | 6/2017 | Wang | G06Q 10/04 |
| 2017/0220996 A1* | 8/2017 | High | A47G 29/141 |
| 2018/0300675 A1* | 10/2018 | Arena | H04W 4/40 |

FOREIGN PATENT DOCUMENTS

| | | |
|---|---|---|
| CN | 104503309 A | 4/2015 |
| CN | 204595535 U | 8/2015 |
| CN | 204613674 U | 9/2015 |
| EP | 0436312 A2 | 7/1991 |
| WO | 2009095919 A1 | 8/2009 |
| WO | 2014120806 A1 | 8/2014 |

OTHER PUBLICATIONS

W.E. Perkins, Refrigeration Requirements for Perishable Protective Vehicles, Journal of Cellular Plastics, Nov. 1966, pp. 318-321 (Year: 1966).*

Notification of Transmittal of the International Search Report of International Application No. PCT/US2017/043051; Report dated Sep. 15, 2017; 5 pages.

Written Opinion of the International Searching Authority of International Application No. PCT/US2017/043051; Report dated Sep. 15, 2017; 11 pages.

* cited by examiner

SANITATION MANAGEMENT SYSTEM FOR PERISHABLE GOOD TRANSPORT

CROSS-REFERENCE TO RELATED APPLICATIONS

This application is based on International Application No. PCT/US2017/043051 filed Jul. 20, 2017, which claims priority to U.S. Provisional Patent Application Ser. No. 62/365,686 filed Jul. 22, 2016, both of which are incorporated herein by reference in its entirety.

BACKGROUND OF THE DISCLOSURE

The embodiments disclosed herein generally relate to cold chain distribution systems, and more specifically to an apparatus and a method for sanitizing a container for perishable goods.

Typically, cold chain distribution systems are used to transport and distribute perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

Containers transporting perishable goods may need to be sanitized for a variety of reasons. It is often difficult to determine whether a container needs to be sanitized after carrying a particular perishable good or if sanitization may be delayed. Improved systems to determine when sanitization is necessary would provide benefits to the industry.

BRIEF DESCRIPTION OF THE DISCLOSURE

According to one embodiment, a system for managing sanitation of a container for perishable goods is provided. The system including: a storage device to store perishable good requirements, sanitation schedule parameters, sanitation requirements, sanitation test results, and perishable good parameters associated with the perishable goods; and a sanitation management system coupled to the storage device. The sanitation management system including: a sanitation assessment module to determine sanitation risk levels in response to at least one of the perishable good parameters, the perishable good requirements, the sanitation schedule parameters, sanitation test results, and the sanitation requirements; a sanitation schedule module to determine sanitation schedule adjustments in response to at least one of the sanitation risk level, the sanitation schedule parameters, and the sanitation requirements; and a meshing module to determine output parameters in response to at least one of the sanitation risk levels and the sanitation schedule adjustments.

In addition to one or more of the features described above, or as an alternative, further embodiments of the system may include that the meshing module is configured to transmit output parameters to a user device.

In addition to one or more of the features described above, or as an alternative, further embodiments of the system may include that the storage device is configured to receive from a user device at least one of the sanitation schedule parameters and the sanitation test results.

In addition to one or more of the features described above, or as an alternative, further embodiments of the system may include that the output parameters include at least one of sanitation instructions and sanitation test prompts.

In addition to one or more of the features described above, or as an alternative, further embodiments of the system may include a user device that activates an alarm when the sanitation risk level is greater than or equal to a selected sanitation risk level.

In addition to one or more of the features described above, or as an alternative, further embodiments of the system may include a user device that activates an alarm when the user device receives at least one of sanitation risk levels, sanitation schedule adjustments, and sanitation instructions.

In addition to one or more of the features described above, or as an alternative, further embodiments of the system may include at least one sensor configured to monitor the perishable good parameters of the perishable goods and transmit the perishable good parameters to the storage device.

According to another embodiment, a method of managing sanitation of a container for perishable goods is provided. The method includes: storing, using a storage device, perishable good requirements, sanitation schedule parameters, sanitation requirements, sanitation test results, and perishable good parameters associated with the perishable goods; and analyzing, using a sanitation management system, the perishable good requirements, the sanitation schedule parameters, the sanitation requirements, sanitation test results, and the perishable good parameters. The sanitation management system coupled to the storage device. The sanitation management system including: a sanitation assessment module to determine sanitation risk levels in response to at least one of the perishable good parameters, the perishable good requirements, the sanitation schedule parameters, sanitation test results, and the sanitation requirements; a sanitation schedule module to determine sanitation schedule adjustments in response to at least one of the sanitation risk level, the sanitation schedule parameters, and the sanitation requirements; and a meshing module to determine output parameters in response to at least one of the sanitation risk levels and the sanitation schedule adjustments.

In addition to one or more of the features described above, or as an alternative, further embodiments of the method may include transmitting, using the meshing module, output parameters to a user device.

In addition to one or more of the features described above, or as an alternative, further embodiments of the method may include receiving, using the storage device, from a user device at least one of the sanitation schedule parameters and the sanitation test results.

In addition to one or more of the features described above, or as an alternative, further embodiments of the method may include that the output parameters include at least one of sanitation instructions and sanitation test prompts.

In addition to one or more of the features described above, or as an alternative, further embodiments of the method may include activating, using a user device, an alarm when the sanitation risk level is greater than or equal to a selected sanitation risk level.

In addition to one or more of the features described above, or as an alternative, further embodiments of the method may include activating, using a user device, an alarm when the user device receives at least one of sanitation risk levels, sanitation schedule adjustments, and sanitation instructions.

In addition to one or more of the features described above, or as an alternative, further embodiments of the method may include monitoring, using at least one sensor, the perishable good parameters of the perishable goods; and transmitting the perishable good parameters to the storage device.

According to another embodiment, a computer program product tangibly embodied on a computer readable medium is provided. The computer program product including instructions that, when executed by a processor, cause the processor to perform operations. The operations include: storing, using a storage device, perishable good requirements, sanitation schedule parameters, sanitation requirements, sanitation test results, and perishable good parameters associated with the perishable goods; and analyzing, using a sanitation management system, the perishable good requirements, the sanitation schedule parameters, the sanitation requirements, sanitation test results, and the perishable good parameters. The sanitation management system coupled to the storage device, the sanitation management system including: a sanitation assessment module to determine sanitation risk levels in response to at least one of the perishable good parameters, the perishable good requirements, the sanitation schedule parameters, sanitation test results, and the sanitation requirements; a sanitation schedule module to determine sanitation schedule adjustments in response to at least one of the sanitation risk level, the sanitation schedule parameters, and the sanitation requirements; and a meshing module to determine output parameters in response to at least one of the sanitation risk levels and the sanitation schedule adjustments.

In addition to one or more of the features described above, or as an alternative, further embodiments of the computer program may include that the operations further include: transmitting, using the meshing module, output parameters to a user device.

In addition to one or more of the features described above, or as an alternative, further embodiments of the computer program may include that the operations further include: receiving, using the storage device, from a user device at least one of the sanitation schedule parameters and the sanitation test results.

In addition to one or more of the features described above, or as an alternative, further embodiments of the computer program may include that the output parameters include at least one of sanitation instructions and sanitation test prompts.

In addition to one or more of the features described above, or as an alternative, further embodiments of the computer program may include that the operations further include: activating, using a user device, an alarm when the sanitation risk level is greater than or equal to a selected sanitation risk level.

In addition to one or more of the features described above, or as an alternative, further embodiments of the computer program may include that the operations further include: activating, using a user device, an alarm when the user device receives at least one of sanitation risk levels, sanitation schedule adjustments, and sanitation instructions.

In addition to one or more of the features described above, or as an alternative, further embodiments of the computer program may include that the operations further include: monitoring, using at least one sensor, the perishable good parameters of the perishable goods; and transmitting the perishable good parameters to the storage device.

Technical effects of embodiments of the present disclosure include tracking various parameters of perishable goods and using the parameters to determine the sanitation needs of a transport container.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
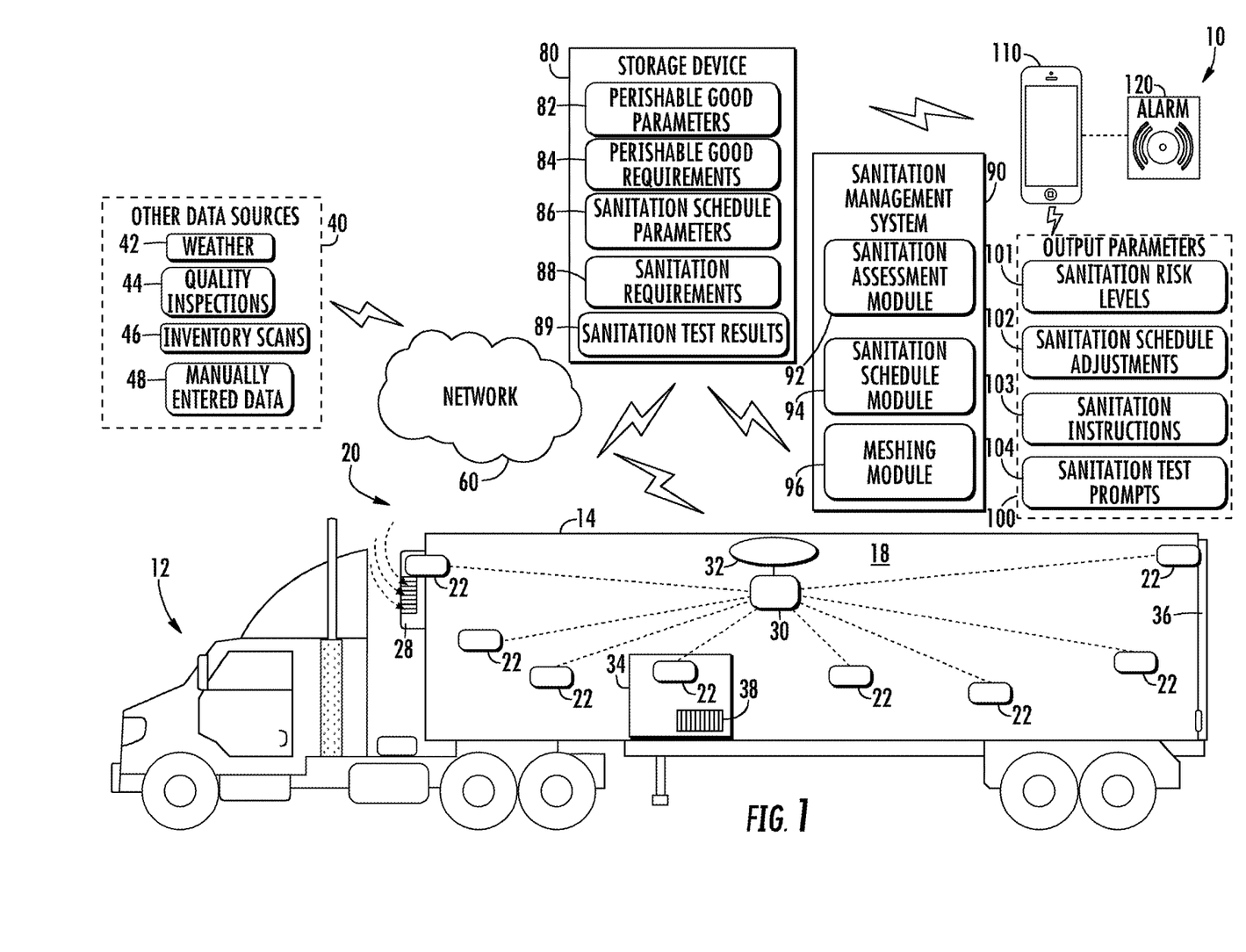
FIG. 1 illustrates a schematic view of a system for managing sanitation of a container for perishable goods, according to an embodiment of the present disclosure.
Figure 2:
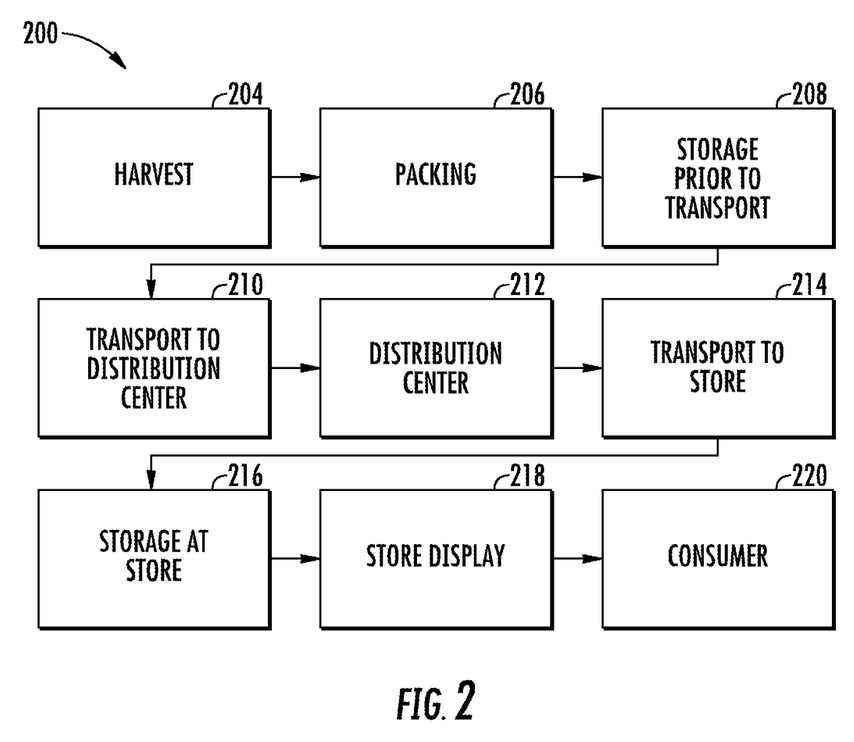
FIG. 2 illustrates a schematic view of a cold chain distribution system that may incorporate embodiments of the present disclosure.

Referring now to the drawings, FIG. 1 illustrates a schematic view of a system 10 for managing sanitation of a container 14 for transporting perishable goods 34, according to an embodiment of the present disclosure. FIG. 2 illustrates a schematic view of a cold chain distribution system 200 that may incorporate embodiments of the present disclosure. Typically, transport refrigeration systems 20 are used to transport and distribute perishable goods and environmentally sensitive goods (herein referred to as perishable goods 34). In the illustrated embodiment, a transport refrigeration system 20 includes the environmentally controlled container 14, a transport refrigeration unit 28 and perishable goods 34. The container 14 may be pulled by a tractor 12. The container 14 may define an interior compartment 18. It is understood that embodiments described herein may be applied to shipping containers that are shipped by rail, sea, or any other suitable container, without use of a tractor 12. It is also understood that embodiments described herein may be applied to stationary containers for holding perishable goods, such as, for example, cold storage warehouses, refrigerators, or walk-in coolers.

In the illustrated embodiment, the transport refrigeration unit 28 is associated with a container 14 to provide desired environmental parameters, such as, for example, temperature, pressure, humidity, carbon dioxide, ethylene, ozone, light exposure, vibration exposure, and other conditions to the interior compartment 18. In an embodiment, the transport refrigeration unit 28 is a refrigeration system capable of providing a desired temperature and humidity range. The perishable goods 34 may include but are not limited to fruits, vegetables, grains, beans, nuts, eggs, dairy, seed, flowers, meat, poultry, fish, ice, blood, pharmaceuticals, or any other suitable cargo requiring cold chain transport.

In the illustrated embodiment, the transport refrigeration system 20 includes sensors 22, which may be hardwired or wireless. The sensors 22 may be utilized to monitor perishable good parameters 82 of the perishable goods 34. The perishable good parameters 82 monitored by the sensors 22 may include but are not limited to temperature, pressure, humidity, carbon dioxide, ethylene, ozone, light exposure, vibrations, and other conditions in the interior compartment 18. Accordingly, suitable sensors 22 are utilized to monitor the desired perishable good parameters 82. Advantageously, sensors 22 may be selected for certain applications depending on the type of perishable goods 34 to be monitored and the corresponding environmental sensitivities. For instance, perishable goods 34 that are hyper sensitive to carbon dioxide may require additional sensors 22 specifically for carbon dioxide. In an embodiment, temperatures are monitored. As seen in FIG. 1, the sensors 22 may be placed directly on the perishable goods 34.

Additionally, the sensors 22 may be placed in a variety of locations including but not limited to on the transport refrigeration unit 28, on a door 36 of the container 14 and throughout the interior compartment 18. The sensors 22 may be placed directly within the transport refrigeration unit 28 to monitor the performance of the transport refrigeration unit 28. As seen, the sensors 22 may also be placed on the door 36 of the container 14 to monitor the position of the door 36. Whether the door 36 is open or closed affects both the temperature of the container 14 and the perishable goods 34. For instance, in hot weather, an open door 36 will allow cooled air to escape from the container 14, causing the temperature of the interior compartment 18 to rise, thus affecting the temperature of the perishable goods 34 and potentially leading to spoilage. Spoilage of perishable goods may require additional sanitation of container 14 due to excess odor, fluid, or potential bacterial growth. Additionally, a global positioning system (GPS) location may also be detected by the sensors 22. The GPS location may help in providing time-based location information for the perishable goods 34 that will help in tracking the travel route and other perishable good parameters 82 along that route. For instance, the GPS location may also help in providing information from other data sources 40 regarding weather 42 experienced by the container 14 along the travel route. The local weather 42 affects the temperature of the container 14 and thus may affect the temperature of the perishable goods 34.

As illustrated in FIG. 1, the transport refrigeration system 20 may further include, a controller 30 configured to log a plurality of readings from the sensors 22, known as the perishable good parameters 82, at a selected sampling rate. The controller 30 may be enclosed within the transport refrigeration unit 28 or separate from the transport refrigeration unit 28 as illustrated. The perishable good parameters 82 may further be augmented with time, location stamps or other relevant information. The controller 30 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an illustrated embodiment, the transport refrigeration system 20 may include a communication module 32 in operative communication with the controller 30 and in wireless operative communication with a network 60. The communication module 32 is configured to transmit the perishable good parameters 82 to the network 60 via wireless communication. The wireless communication may be, but is not limited to, radio, microwave, cellular, satellite, or another wireless communication method. The network 60 may be but is not limited to satellite networks, cellular networks, cloud computing network, wide area network, or another type of wireless network. The communication module 32 may include a short range interface. The short range interface includes at least one of: a wired interface, an optical interface, and a short range wireless interface.

Perishable good parameters 82 may also be provided by other data sources 40, as illustrated in FIG. 1. These other data sources 40 may be collected at any point throughout the cold chain distribution system 200, which as illustrated in FIG. 2 may include harvest 204, packing 206, storage prior to transport 208, transport to distribution center 210, distribution center 212, transport to store 214, storage at store 216, store display 218 and consumer 220. The perishable goods 34 may be carried in the container during the transport to distribution center 210 and the transport to store 214. These stages are provided for illustrative purposes and a distribution chain may include fewer stages or additional stages, such as, for example, a cleaning stage, a processing stage, and additional transportation stages. The other data sources 40 may include, but are not limited to, weather 42, quality inspections 44, inventory scans 46, and manually entered data 48. The weather 42, as discussed above, has an effect on the operation of the transport refrigeration unit 28 by influencing the temperature of the container 14 during transport (e.g., 210 and 214) but the weather 42 also has other influences on the transport refrigeration unit 28. For instance, the weather 42 prior to and at harvest 204 may have an impact on the quality of the perishable goods 34. Moreover, quality inspections 44, similar to the weather 42, may reveal data of the perishable goods 34 that affects quality and potential for spoilage during transport. For instance, a particular batch of strawberries was subjected to rainfall just prior to harvest 204, making them prone to spoilage while in the container 14. Quality inspections 44 may be done by a machine or a human being. Quality inspections 44 performed by a machine may be accomplished using a variety of techniques including but not limited to optical, odor, soundwave, infrared, or physical probe.

Further, inventory scans 46 may also reveal perishable good parameters 82 about the perishable goods 34 and may help in tracking the perishable goods 34. For instance, the inventory scan 46 may reveal the time, day, truck the perishable goods arrived on, which may help identify the farm if previously unknown. Knowing the origin of the perishable goods 34 may help in tracking potential contamination issues that may arise at a particular farm or production plant. For instance, if one farm experiences a listeria outbreak in a spinach crop, it would be important to identify the container 14 carrying that particular spinach and sanitize the container 14 as soon as possible. While the system 10 includes sensors 22 to aid in automation, often times the need for manual data entry is unavoidable. The manually entered data 48 may be input via a variety of devices including but not limited to a cellular phone, tablet, laptop, smartwatch, a desktop computer or any other similar data input device known to one of skill in the art.

Perishable good parameters 82 collected throughout each stage of the cold chain distribution system 200 may include environment conditions experienced by the perishable goods 34 such as, for example, temperature, pressure, humidity, carbon dioxide, ethylene, ozone, vibrations, light exposure, weather, time and location. For instance, strawberries may have experienced an excessive shock or were kept at 34° F. during transport. Perishable good parameters 82 may further include attributes of the perishable goods 34 such as, for example, temperature, weight, size, sugar content, maturity, grade, ripeness, labeling, packaging and the type of perishable good. For instance, strawberries may be packaged in 1 pound clamshells, be a certain weight or grade, be organic, and have certain packaging or labels on the clamshells. Packaging may offer some addition protection against contamination while the perishable good 34 is being transported in the container 14.

Perishable good parameters 82 may include information regarding the type of perishable good, which may help prevent contamination issues between incompatible perishable goods 34. The type of perishable good 34 within the container may be identified by a manifest or contents list for the container 14 as manually entered data 48. The type of perishable good 34 within the container may also be identified by inventory scans 46, or scans of ID tags 38. The ID tag 38 may be a Universal Product Code (UPC) bar code, Quick Response (QR) code, Radio-frequency identification (RFID) or another identification methodology known to one of skill in the art. Perishable good parameters 82 may also include information regarding the operation of the environmental control unit 28, as discussed above. The perishable good parameters 82 may further be augmented with time, location stamps or other relevant information.

In the illustrated embodiment, the system 10 further includes a storage device 80 to store the perishable good parameters 82 associated with the perishable goods 34. At least one of the perishable good parameters 82 may be received from a transport refrigeration system 20. The storage device 80 is connected to the communication module 32 through the network 60. The storage device 80 may be but is not limited to a random access memory (RAM), read only memory (ROM), or other electronic, optical, magnetic or any other computer readable medium. The storage device may also store perishable good requirements 84, sanitation schedule parameters 86, sanitation requirements 88, and sanitation test results 89, as discussed below.

In the illustrated embodiment, the system 10 further includes a sanitation management system 90. The sanitation management system 90 is connected to the communication module 32 through the network 60. The sanitation management system 90 is also coupled to the storage device 80. As shown, the sanitation management system 90 includes a sanitation assessment module 92, a sanitation schedule module 94, and a meshing module 96. The sanitation management system 90 may also include a processor (not shown) and an associated memory (not shown). The associated memory may be the storage device 80. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The sanitation assessment module 92, the sanitation schedule module 94, and the meshing module 96 may be implemented in software as applications executed by the processor of sanitation management system 90.

The sanitation assessment module 92 determines sanitation risk levels 101 in response to at least one of the perishable good parameters 82, the perishable good requirements 84, sanitation schedule parameters 86, sanitation requirements 88, and sanitation test results 89. The sanitation schedule module 94 determines sanitation schedule adjustments 102 in response to at least one of the sanitation risk level 101, sanitation schedule parameters 86, and sanitation requirements 88. The perishable good requirements 84 may be requirements for handling and/or packaging the perishable good 34 such as, for example, government regulations or industry standards. The sanitation risk level 101 associated with the perishable good 34 may increase if some of the perishable good parameters 82 do not satisfy the perishable good requirements 84. In one example, the sanitation risk level 101 may increase due to the perishable goods 34 being kept at elevated temperatures during transportation, which is recorded as a perishable good parameter 84. In a second example, there might be a recall of a perishable good 34 due to a listeria outbreak, which may raise the sanitation risk level 101. In a third example, the sanitation risk level 101 may increase if one perishable good previously in the transport container may contaminate a perishable good currently in the container 14.

Sanitation schedule parameters 86 are parameters regarding the sanitation requirements of the specific container 14, such as, for example, the sanitation schedule including past sanitation and planned future sanitation. The sanitation schedule parameter 86 may also include information regarding size of the container 14, shape of the container 14, material of the container 14, components within the container 14, and container components that may require specific cleaning. For instance, the transport refrigeration unit 28 may require special sanitation instructions 103. In a further example, a filter of the transport refrigeration unit 28 may need to be changed after carry a particular type of perishable goods 34. Sanitation requirements 88 may include government regulations and/or industry standards regarding when and how often the container 14 must be sanitized. Sanitation requirements 88 may dictate that the container must be sanitized after carrying a particular perishable good 34. For example, contamination from allergens, pesticides, GMOs, and/or odors may cause contamination issues for the next perishable good transported in the container 14, which may prompt sanitation. In another example, sanitation requirements 88 may dictate that two different types of perishable good may not be carried in the same container 14 due to contamination. Sanitation test results 89 may be the test data from automatic screening for certain chemical elements or molecules within the container 14 and/or manual sanitation tests performed by a person. The sanitation test results 89 may be the results of scheduled or impromptu sanitation tests. The sanitation test results 89 are then stored in the storage device 80.

The meshing module 96 determines output parameters 100 in response to at least one of the sanitation risk levels 101 and the sanitation schedule adjustments 102. In an embodiment, the output parameters 100 may include at least one of the sanitation risk levels 101, the sanitation schedule adjustments 102, sanitation instructions 103, and sanitation test prompts 104. The meshing module 96 may determine that a sanitation test of the container 14 is required and issue a sanitation test prompt 104 in certain instances such as, for example, when more information is needed to determine a sanitation risk level 101 or a sanitation schedule adjustment 102, and/or a sanitation test is regularly scheduled. The output parameters 100 may be accessible via a user device 110 and/or sent directly to the user device 110. The user device 110 may be a device such as, for example, a cellular phone, tablet, laptop, smartwatch, a desktop computer or any other similar data input device known to one of skill in the art. The meshing module 96 may be configured to transmit the output parameters 100 to the user device 110.

The user device 110 may activate an alarm 120 when the sanitation risk level 101 is greater than or equal to a selected sanitation risk level. The alarm 120 may also be activated manually, such as, for example, by the driver of the tractor 12 or by another individual remotely monitoring the sanitation risk levels 101, sanitation schedule parameters 86. The alarm 120 may be audible and/or visual. The alarm 120 may indicate that sanitation of the container 14 is required and provide sanitation instructions 103. Sanitation instructions 103 may dictate, what to sanitize, how to sanitize, and how long to sanitize. The user device 110 may activate the alarm 120 when the user device receives 110 at least one of sanitation risk levels 101, sanitation schedule adjustments 102, and sanitation instructions 103. The user device 110 may also activate the alarm 120 when a sanitation schedule parameter 86 dictates that sanitation is required, such as, for example, a prescheduled sanitation and/or a sanitation schedule adjustment 102. An individual may transmit sanitation schedule parameters 86 to the storage device 80. For example, once sanitation has been performed an individual may indicate that the sanitation has been performed on the user device 110, which will then transmit the sanitation completion as a sanitation schedule parameters 86 to the storage device 80. The user device 110 may also activate the alarm 120 when a sanitation test prompt 104 is received. The sanitation test prompt 104 may indicate that sanitation test of the container 14 is required and provide instructions on how the sanitation test should be carried out. The sanitation test instructions in the sanitation test prompt 104 may dictate, what to test, how to test, and how long to test. An individual may transmit sanitation test results 89 to the storage device 80. For example, once sanitation test has been performed an individual may input the sanitation test results 89 to the user device 110, which will then transmit the sanitation test results 89 to the storage device 80. The storage device 80 is configured to receive at least one of the sanitation schedule parameters 86 and sanitation test results 89 from the user device 110.

Figure 3:
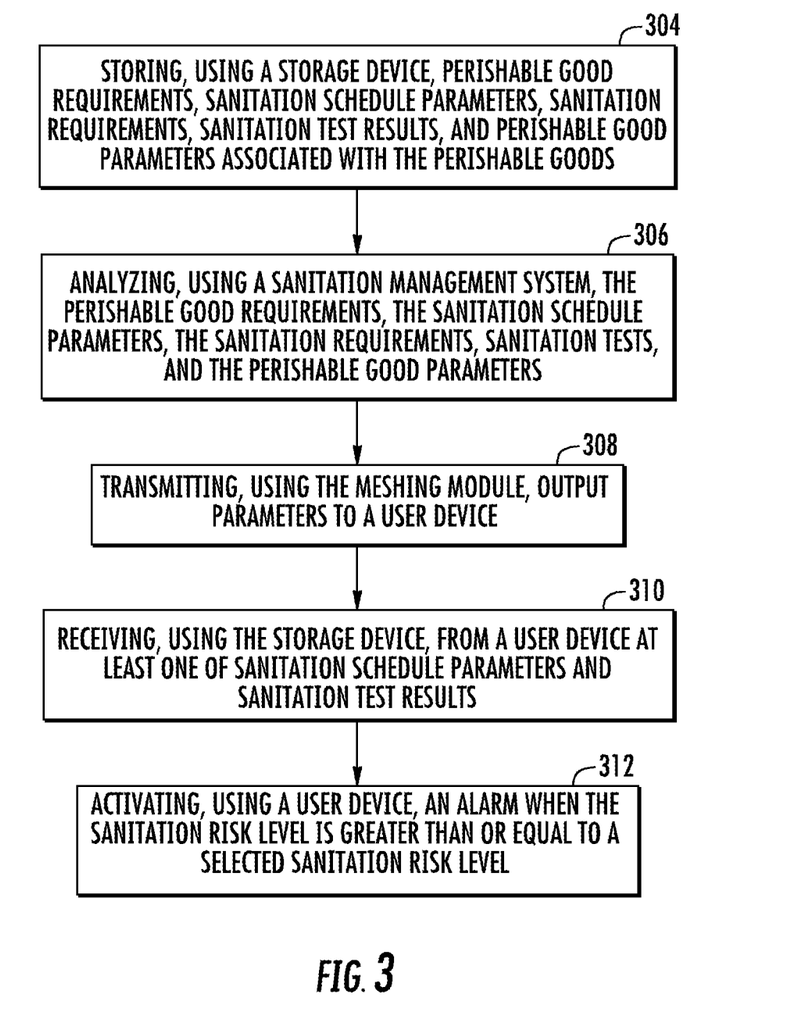
FIG. 3 is a flow diagram illustrating a method of managing sanitation of a container for perishable goods, according to an embodiment of the present disclosure.

Referring now also to FIG. 3, which shows a flow diagram illustrating a method 300 of managing sanitation of a container 14 for transporting perishable goods 34, according to an embodiment of the present disclosure. At block 304, the storage device 80 stores perishable good requirements 84, sanitation schedule parameters 86, sanitation requirements 88, sanitation test results 89, and perishable good parameters 82 associated with the perishable goods 34. At block 306, the sanitation management system 90 analyzes the perishable good requirements 84, the sanitation schedule parameters 86, the sanitation requirements 88, sanitation test results 89, and the perishable good parameters 82. The sanitation management system 90 is coupled to the storage device 80. As described above, the sanitation management system 90 includes: the sanitation assessment module 92 to determine sanitation risk levels 101 in response to at least one of the perishable good parameters 82, the perishable good requirements 84, the sanitation schedule parameters 86, sanitation test results 89, and the sanitation requirements 88; a sanitation schedule module 94 to determine sanitation schedule adjustments 102 in response to at least one of the sanitation risk level 101, the sanitation schedule parameters 86, and the sanitation requirements 88; and a meshing module 96 to determine output parameters 100 in response to at least one of the sanitation risk levels 101 and the sanitation schedule adjustments 102.

Further, at block 308, the meshing module 96 may transmit output parameters 100 to the user device 110. At block 310, the storage device 80 may receive from the user device 110 at least one of the sanitation schedule parameters 86 and the sanitation test results 89. At block 312, the user device 110 may activate the alarm 120 when the sanitation risk level 101 is greater than or equal to the selected sanitation risk level. The method 300 may also include monitoring, using at least one sensor 22, the perishable good parameters 82 of the perishable goods 34; and transmitting the perishable good parameters 82 to the storage device 80.

While the above description has described the flow process of FIG. 3 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for managing sanitation of a container for perishable goods, the system comprising:
   at least one sensor configured to monitor perishable good parameters of the perishable goods, wherein the perishable good parameters comprise environmental conditions within the container, wherein the environmental conditions comprise at least one of temperature, pressure, humidity, carbon dioxide, ethylene, ozone, light exposure, vibrations, chemical elements, and molecules within the container;
      wherein the at least one sensor is configured to screen for certain chemical elements or molecules within the container to produce sanitation test results, wherein the sanitation test results are test data from automatic screening for the certain chemical elements or molecules within the container, and wherein the at least one sensor is configured to detect a global position system (GPS) location, wherein the GPS location provides time-based location information for the perishable goods, and wherein the perishable good parameters are augmented with the time-based location information;

a storage device to store perishable good requirements, sanitation schedule parameters, sanitation requirements, the sanitation test results, and perishable good parameters associated with the perishable goods; and a sanitation management system coupled to the storage device, the sanitation management system including:

a sanitation assessment module configured to determine sanitation risk levels in response to the perishable good parameters, the perishable good requirements, the sanitation schedule parameters, sanitation test results, and the sanitation requirements;

a sanitation schedule module configured to determine sanitation schedule adjustments in response to the sanitation risk level, the sanitation schedule parameters, and the sanitation requirements; and a meshing module configured to determine output parameters in response to the sanitation risk levels and the sanitation schedule adjustments.

2. The system of claim 1, wherein:
the meshing module is configured to transmit output parameters to a user device.

3. The system of claim 1, wherein:
the storage device is configured to receive from a user device at least one of the sanitation schedule parameters and the sanitation test results.

4. The system of claim 2, wherein:
the output parameters include at least one of sanitation instructions and sanitation test prompts.

5. The system of claim 1, further comprising:
a user device configured to activate an alarm when the sanitation risk level is greater than or equal to a selected sanitation risk level.

6. The system of claim 1, further comprising:
a user device configured to activate an alarm when the user device receives at least one of sanitation risk levels, sanitation schedule adjustments, and sanitation instructions.

7. The system of claim 1, wherein
the at least one sensor is configured to transmit the perishable good parameters to the storage device.

8. A method of managing sanitation of a container for perishable goods, the method comprising:

monitoring, using at least one sensor, perishable good parameters of the perishable goods, wherein the perishable good parameters comprise environmental conditions within the container, wherein the environmental conditions comprise at least one of temperature, pressure, humidity, carbon dioxide, ethylene, ozone, light exposure, vibrations, chemical elements, and molecules within the container, wherein the at least one sensor is configured to screen for certain chemical elements or molecules within the container to produce sanitation test results, wherein the sanitation test results are test data from automatic screening for the certain chemical elements or molecules within the container;

detecting, using the at least one sensor, a global position system (GPS) location, wherein the GPS location provides time-based location information for the perishable goods;

augmenting the perishable good parameters with the time-based location information;

storing, using a storage device, perishable good requirements, sanitation schedule parameters, sanitation requirements, the sanitation test results, and perishable good parameters associated with the perishable goods;

analyzing, using a sanitation management system, the perishable good requirements, the sanitation schedule parameters, the sanitation requirements, sanitation test results, and the perishable good parameters, the sanitation management system coupled to the storage device, the sanitation management system including: a sanitation assessment module, a sanitation schedule module, and a meshing module, determining using the sanitation assessment module, sanitation risk levels in response to the perishable good parameters, the perishable good requirements, the sanitation schedule parameters, sanitation test results, and the sanitation requirements;

determining using the sanitation schedule module, sanitation schedule adjustments in response to the sanitation risk level, the sanitation schedule parameters, and the sanitation requirements; and determining using the meshing module, output parameters in response to the sanitation risk levels and the sanitation schedule adjustments.

9. The method of claim 8, further comprising:
transmitting, using the meshing module, output parameters to a user device.

10. The method of claim 8, further comprising:
receiving, using the storage device, from a user device at least one of the sanitation schedule parameters and the sanitation test results.

11. The method of claim 10, wherein:
the output parameters include at least one of sanitation instructions and sanitation test prompts.

12. The method of claim 8, further comprising:
activating, using a user device, an alarm when the sanitation risk level is greater than or equal to a selected sanitation risk level.

13. The method of claim 8, further comprising:
activating, using a user device, an alarm when the user device receives at least one of sanitation risk levels, sanitation schedule adjustments, and sanitation instructions.

14. The method of claim 8, further comprising:
transmitting the perishable good parameters to the storage device.

15. A computer program product tangibly embodied on a non-transitory computer readable medium, the computer program product including instructions that, when executed by a processor, cause the processor to perform operations comprising:

monitoring, using at least one sensor, perishable good parameters of the perishable goods, wherein the perishable good parameters comprise environmental conditions within the container, wherein the environmental conditions comprise at least one of temperature, pressure, humidity, carbon dioxide, ethylene, ozone, light exposure, vibrations, chemical elements, and molecules within the container, wherein the at least one sensor is configured to screen for certain chemical elements or molecules within the container to produce sanitation test results, wherein the sanitation test results are test data from automatic screening for the certain chemical elements or molecules within the container;

detecting, using the at least one sensor, a global position system (GPS) location, wherein the GPS location provides time-based location information for the perishable goods;

augmenting the perishable good parameters with the time-based location information;

storing, using a storage device, perishable good requirements, sanitation schedule parameters, sanitation requirements, sanitation test results, and the perishable good parameters associated with the perishable goods;

analyzing, using a sanitation management system, the perishable good requirements, the sanitation schedule parameters, the sanitation requirements, the sanitation test results, and the perishable good parameters, the sanitation management system coupled to the storage device, the sanitation management system including: a sanitation assessment module, a sanitation schedule module, and a meshing module;

determining, using the sanitation assessment module, sanitation risk levels in response to the perishable good parameters, the perishable good requirements, the sanitation schedule parameters, sanitation test results, and the sanitation requirements;

determining, using the sanitation schedule module, sanitation schedule adjustments in response to the sanitation risk level, the sanitation schedule parameters, and the sanitation requirements; and determining, using the meshing module, output parameters in response to the sanitation risk levels and the sanitation schedule adjustments.

16. The computer program product of claim 15, wherein the operations further comprise:
transmitting, using the meshing module, output parameters to a user device.

17. The computer program product of claim 15, wherein the operations further comprise:
receiving, using the storage device, from a user device at least one of the sanitation schedule parameters and the sanitation test results.

18. The computer program product of claim 17, wherein:
the output parameters include at least one of sanitation instructions and sanitation test prompts.

19. The computer program product of claim 15, wherein the operations further comprise:
activating, using a user device, an alarm when the sanitation risk level is greater than or equal to a selected sanitation risk level.

20. The computer program product of claim 15, wherein the operations further comprise:
activating, using a user device, an alarm when the user device receives at least one of sanitation risk levels, sanitation schedule adjustments, and sanitation instructions.

* * * * *